United States Patent
Uchida et al.

(10) Patent No.: US 7,515,655 B2
(45) Date of Patent: Apr. 7, 2009

(54) WIRELESS COMMUNICATION APPARATUS AND WIRELESS COMMUNICATION METHOD

(75) Inventors: Shigenori Uchida, Kanagawa (JP); Shinichi Kuroda, Tokyo (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 11/387,851

(22) Filed: Mar. 24, 2006

(65) Prior Publication Data

US 2006/0227889 A1  Oct. 12, 2006

(30) Foreign Application Priority Data

Apr. 1, 2005  (JP) ............................ P2005-106040

(51) Int. Cl.
*H03K 9/00* (2006.01)
*H04L 27/00* (2006.01)
(52) U.S. Cl. .................. 375/316; 375/260; 375/267
(58) Field of Classification Search .......... 375/134, 375/145, 149, 259–260, 267, 316, 322, 324; 370/208, 210; 455/39, 500, 507, 517, 522, 455/93, 114.2, 114.3
See application file for complete search history.

(56) References Cited

U.S. PATENT DOCUMENTS

| | | | |
|---|---|---|---|
| 6,285,663 B1 * | 9/2001 | Esmailzadeh | 370/311 |
| 2003/0003863 A1 * | 1/2003 | Thielecke et al. | 455/39 |
| 2004/0157646 A1 * | 8/2004 | Raleigh et al. | 455/562.1 |
| 2004/0192218 A1 * | 9/2004 | Oprea | 455/73 |

FOREIGN PATENT DOCUMENTS

JP  2002-44051  2/2002

OTHER PUBLICATIONS

A. Benjebbour, et al., "Performance of Iterative Successive Detection Algorithm for Space-Time Transmission", Proc. IEEE VTC Spring, vol. 2, pp. 1287-1291, Rhodes, Greece, May 2001.
A. Benjebbour, et al., "Comparision of Ordered Successive Receivers for Space-Time Transmission", Proc. IEEE VTC Fall, vol. 4, pp. 2053-2057, Atlantic City, USA, Sep. 2001.
G.J. Foschini et al, "On Limits of Wireless Communications in a Fading Environment when Using Multiple Antennas" (Wireless Personal Communications, vol. 6, No. 3, pp. 311-335, Mar. 1998).

* cited by examiner

*Primary Examiner*—Shuwang Liu
*Assistant Examiner*—James M Perez
(74) *Attorney, Agent, or Firm*—Finnegan, Henderson, Farabow, Garrett & Dunner, L.L.P.

(57) ABSTRACT

Disclosed is a wireless communication apparatus which receives, by multiple antennas, signals created by spatially multiplexing multiple transmit streams subjected to power allocation. The wireless communication apparatus has a channel matrix estimator which estimates a channel matrix of spatially multiplexed channels, a spatial demultiplexer which obtains an antenna receive weight matrix from the estimated channel matrix and demultiplexes into multiple receive streams by multiplying receive signals of antennas by the antenna receive weight matrix, and a power estimator which estimates power allocation information as to each stream. In the wireless communication apparatus, the channel matrix estimator estimates a channel matrix in view of power allocation to each stream estimated by the power estimator.

14 Claims, 8 Drawing Sheets

SYMBOL SECTION 1
(ORTHOGONALLY IN FREQUENCY DIRECTION)

WIRELESS COMMUNICATION APPARATUS AND WIRELESS COMMUNICATION METHOD

CROSS REFERENCES TO RELATED APPLICATIONS

The present invention contains subject matter related to Japanese Patent Application No. 2005-106040 filed in the Japanese Patent Office on Apr. 1, 2005, the entire contents of which being incorporated herein by reference.

BACKGROUND OF THE INVENTION

1. Field of the Invention

The present invention relates to a wireless communication apparatus and a wireless communication method that carry out MIMO (Multi Input Multi Output) communication in which multiple logical channels are formed by using spatial multiplexing. In particular, the invention relates to a wireless communication apparatus and a wireless communication method that further enhance communication capacity by carrying out spatial multiplexing transmission in which some weighting (beam forming) is performed at a transmitter.

More specifically, the invention relates to a wireless communication apparatus and a wireless communication method that perform spatial multiplexing transmission operation with high transmission efficiency by using increased communication capacity obtained by performing at a transmitter optimal allocation of transmission power to transmit streams. In particular, the invention relates to a wireless communication apparatus and a wireless communication method that allows a receiver to spatially demultiplex, with high performance, a spatially multiplexed signal composed of multiple transmit streams to which power is allocated.

2. Description of the Related Art

Wireless networks draw attention as systems that free users from cable wiring in traditional wire communication schemes. Canonical standards for the wireless networks include IEEE (the Institute of Electrical and Electronics Engineers) 802.11.

For example, in IEEE802.11a/g, an OFDM (Orthogonal Frequency Division Multiplexing) modulation scheme which is one of the multicarrier schemes is adopted as a canonical standard for wireless LANs. In the OFDM modulation scheme, the frequencies of subcarriers are set such that the subcarriers are orthogonal to each other in a symbol section. That the subcarriers are orthogonal to each other signifies that the peak point of the spectrum of an arbitrary subcarrier always matches the zero point of the spectra of other subcarriers. According to the OFDM modulation scheme, transmit data streams are allocated to multiple carriers having different frequencies and transmitted; therefore, the bandwidth of each carrier becomes narrow, thus providing high frequency utilization efficiency and high resistance to frequency-selective fading interference.

An OFDM transmitter converts information from serial to parallel form for each symbol period which is slower than an information transmission rate, allocates a plurality of converted data to subcarriers, modulates the amplitude and phase of each subcarrier, transforms the modulated signals in to signals on the time axis while maintaining the orthogonality of each subcarrier on the frequency axis by performing an inverse FFT on the multiple subcarriers, and transmits the transformed signals. Further, as the inverse operations, an OFDM receiver transforms signals on the time axis to signals on the frequency axis by performing an FFT, demodulates each subcarrier in accordance with each modulation scheme, and converts the demodulated signals from parallel to serial form to reproduce the information of an original serial signal.

The IEEE802.11a standard supports a modulation scheme achieving a communication speed of up to 54 Mbps. However, there is a need for additional standards that can realize a higher bit rate of communication speed.

The MIMO communication attracts attention as one technology for realizing higher-speed wireless communication. The MIMO communication scheme achieves spatially multiplexed transmission channels (hereinafter referred to as "MIMO channels") in a MIMO system where both transmitter and receiver have multiple antenna elements. The transmitter allocates transmit data streams to the multiple antennas and transmits them through MIMO channels. At the other end, the receiver can extract receive data without crosstalk through signal processing on the spatially multiplexed signals received by its multiple antennas (e.g., see patent document 1). For example, in the standardization work of IEEE802.11n, there are continuing discussions centering on methods for realizing high-speed wireless communication by combining OFDM adopted in IEEE802.11a/g and the above-described MIMO communication scheme.

The MIMO communication scheme can achieve enhancement in communication capacity and communication speed in accordance with the number of antennas without increasing the frequency band. Further, the MIMO communication scheme uses the spatial multiplexing, so that it exhibits high frequency utilization efficiency. The MIMO communication scheme exploits channel characteristics, unlike simple adaptive antenna arrays at the transmitter and the receiver.

In general, the channel model is configured of a radio environment (transfer function) around the transmitter, a channel space structure (transfer function), and a radio environment (transfer function) around the receiver. Multiplexed signals transmitted from the antennas involve crosstalk. However, the receiver can correctly process the multiplexed signals without crosstalk through reception processing in accordance with channel characteristics.

Figure 9:
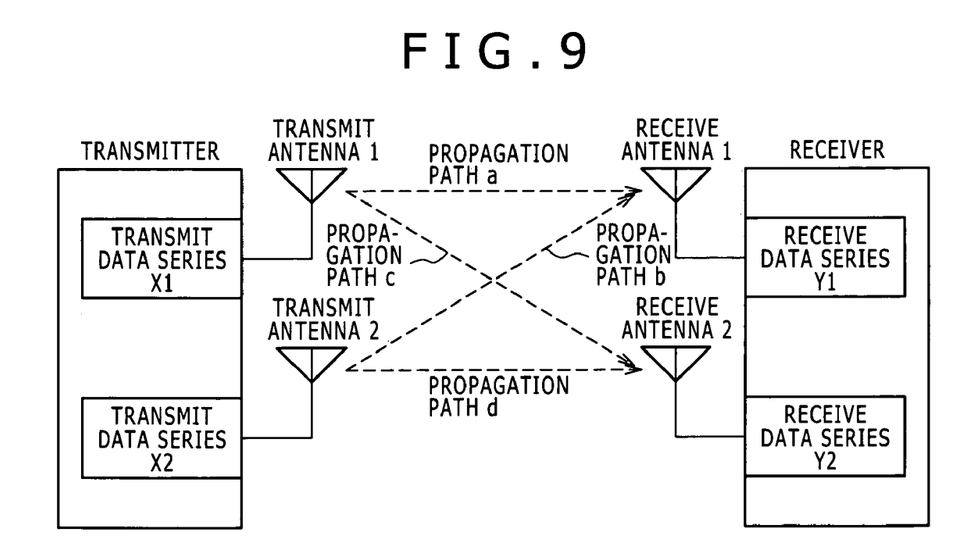
FIG. 9 is a conceptual diagram of a MIMO communication system.

FIG. 9 conceptually shows a MIMO communication system. A MIMO transmitter is provided with two antennas, namely, transmit antenna 1 and transmit antenna 2. At the other end, the receiver is also provided with two antennas, namely, receive antenna 1 and receive antenna 2. In FIG. 9, propagation path a denotes the propagation path between transmit antenna 1 and receive antenna 1. Propagation path b denotes the propagation path between transmit antenna 2 and receive antenna 1. Propagation path c denotes the propagation path between transmit antenna 1 and receive antenna 2. Propagation path d denotes the propagation path between transmit antenna 2 and receive antenna 2. Further, the transmitter allocates transmit data series X1 and X2 to transmit antennas 1 and 2, respectively. The receiver receives receive data series Y1 and Y2 at receive antennas 1 and 2, respectively. In this case, the conditions of the propagation paths are expressed in the following equation (1).

$$\begin{pmatrix} Y1 \\ Y2 \end{pmatrix} = \begin{pmatrix} a & b \\ c & d \end{pmatrix} \begin{pmatrix} X1 \\ X2 \end{pmatrix} \qquad (1)$$

When a channel matrix H in this case is defined as the following equation (2), the inverse matrix $H^{-1}$ of the channel matrix H as an antenna receive weight matrix W is expressed as the following equation (3).

$$H = \begin{pmatrix} a & b \\ c & d \end{pmatrix} \quad (2)$$

$$H^{-1} = \begin{pmatrix} a & b \\ c & d \end{pmatrix}^{-1} \quad (3)$$

Therefore, by multiplying receive signal series Y1 and Y2 by the inverse matrix $H^{-1}$ of the channel matrix H as shown in the following equation (4), receive signal series X1 and X2 are expressed in the following equation (5).

$$\begin{pmatrix} X1 \\ X2 \end{pmatrix} = \begin{pmatrix} a & b \\ c & d \end{pmatrix}^{-1} \begin{pmatrix} Y1 \\ Y2 \end{pmatrix} \quad (4)$$

Two transmit antennas and two receive antennas are shown in FIG. 9. However, as long as the number of antennas is two or more, a MIMO communication system can be constructed in the same way. The transmitter space-time encodes multiple transmit data streams, multiplexes the encoded data, allocates the multiplexed signals to M transmit antennas, and transmits them onto MIMO channels. The receiver receives the multiplexed transmit signals by N receive antennas through the MIMO channels and space-time decodes the received transmit signals to obtain receive data. The number of formed MIMO streams ideally matches the number of transmit antennas M or the number of receive antennas N, whichever is smaller, min[M, n].

In order to spatially demultiplex the spatially multiplexed receive signals y into the stream signals x as descried above, the MIMO receiver needs to acquire the channel matrix H in some way and obtain the receive weight matrix W from the channel matrix H in accordance with a predetermined algorithm.

For example, the transmitter transmits training signals composed of known signal series, and the receiver can acquire the channel matrix H using the training signals.

Further, as a relatively simple algorithm for obtaining the receive weight matrix W from the channel matrix H, there is known Zero Force (e.g., see non-patent document 1) and MMSE (Minimum Mean Square Error) (e.g., see non-patent document 2). Zero Force is a method based on the logic of completely eliminating crosstalk. On the other hand, MMSE is a method based on the logic of maximizing the ratio of signal power to square error (sum of crosstalk power and noise power). In MMSE, the receive weight matrix W (inverse matrix of the channel matrix) is obtained by generating crosstalk intentionally, under the concept of noise power of the receiver. It is known that MMSE is superior to Zero Force in a high-noise environment.

As described above, by disposing multiple transmit/receive antennas, the MIMO communication system can enhance communication capacity without increasing the frequency band. The communication capacity of MIMO transmission can be further enhanced by carrying out spatial multiplexing transmission in which some weighting (beam forming) is performed at the transmitter.

The problem of how to allocate transmission power to maximize the overall communication capacity can be solved by, for example, a water filling principal (e.g., see non-patent document 3). The water filling principal refers to a principal that sets each transmission power to a value obtained by subtraction from the amount proportional to attenuation of the channel. According to the water filling principal, the transmitter performs power allocation by which higher transmission power is allocated to a channel in good condition and lower power is allocated to a channel in poor condition, thus maximizing the communication capacity of the MIMO communication system.

Consideration will be given to the case where the MMSE is employed in the reception process in MIMO communication. In the MMSE process, noise power is added to the diagonal elements of the channel matrix created from training signals, thereby to cancel interference and noise adjusting the balance between the interference and the noise and to acquire desired signal components. The MMSE is superior under a high-noise environment.

It should be noted that acquiring a channel matrix from training signals having the same power and demultiplexing signals in accordance with the MMSE process is predicated on the allocation of the same power to each stream.

On the other hand, the communication capacity is maximized, for example, by allocating power proportional to the eigenvalue of a channel at the time of carrying out MIMO communication in which some weighting transmission (beam forming) is performed at the transmitter, as described above.

However, there arises a problem when the receiver receives streams subjected to power allocation at the transmitter in accordance with MMSE. This is because the MMSE process is predicated on the allocation of the same power to each stream. In other words, if the receiver performs spatial demultiplexing in accordance with the MMSE process without consideration of per-transmit-stream power allocation values, an accurate antenna weight matrix cannot be obtained. This is not the original MMSE process, thereby causing degradation in characteristics so that the communication capacity is not maximized.

Further, as a method by which the receiver acquires a power allocation value allocated to each stream at the transmitter, there is a possible method by which the transmitter transmits information on the power allocation values. However, since this method requires the provision of an extra header field that does not contribute to information transmission, it is not desirable from the viewpoint of communication capacity.

[Patent document 1] Japanese Patent Application Laid-Open No. 2002-44051

[Non-patent document 1] A. Benjebbour, H. Murata and S. Yoshida, "Performance of iterative successive detection algorithm for space-time transmission", Proc. IEEE VTC Spring, vol. 2, pp. 1287-1291, Rhodes, Greece, May 2001.

[Non-patent document 2] A. Benjebbour, H. Murata and S. Yoshida, "Performance comparison of ordered successive receivers for space-time transmission", Proc. IEEE VTC Fall, vol. 4, pp. 2053-2057, Atlantic City, USA, September 2001.

[Non-patent document 3] G. J. Foschini and M. J. Gans, "On limits of wireless communications in a fading environment when using multiple antennas" (Wireless Personal Communications, vol. 6, no. 3, pp. 311-335, March 1998)

SUMMARY OF THE INVENTION

It is desirable to provide a wireless communication apparatus and a wireless communication method excellent at being able to carry out MIMO communication forming multiple logical channels between a pair of a transmitter with multiple antennas and a receiver with multiple antennas by using spatial multiplexing.

Further, it is desirable to provide a wireless communication apparatus and a wireless communication method excellent at being able to spatially demultiplex, with high performance, a spatially multiplexed signal in which each transmit stream is subjected to beam forming at the transmitter.

Furthermore, it is desirable to provide a wireless communication apparatus and a wireless communication method excellent at being able to spatially demultiplex, with high performance according to the MMSE process, a spatially multiplexed signal in which each transmit stream is subjected to optimal allocation of transmission power at the transmitter and contribute to improved transmission characteristics.

According to an embodiment of the present invention, there is provided a wireless communication apparatus which receives, by multiple antennas, signals created by spatially multiplexing multiple transmit streams subjected to power allocation. The wireless communication apparatus includes a channel matrix estimator which estimates a channel matrix of spatially multiplexed channels, a spatial demultiplexer which obtains an antenna receive weight matrix from the estimated channel matrix and demultiplexes into multiple receive streams by multiplying receive signals of antennas by the antenna receive weight matrix, and a power estimator which estimates power allocation information as to each stream. In the wireless communication apparatus, the channel matrix estimator estimates a channel matrix in view of power allocation to each stream estimated by the power estimator.

The present invention relates to a MIMO communication scheme. A MIMO receiver acquires a channel matrix H, obtains a receive weight matrix W from the channel matrix H in accordance with a predetermined algorithm, and multiplies spatially multiplexed receive signals y by the receive weight matrix W to demultiplex into stream signals x.

The MIMO receiver can obtain the receive weight matrix W from the channel matrix H, for example in accordance with an MMSE process. In this MMSE algorithm, noise power is added to the diagonal elements of the channel matrix created from training signals, thereby to cancel interference and noise adjusting the balance between the interference and the noise and to acquire desired signal components. Therefore, the MMSE is suitable for use in a high-noise environment.

In a MIMO communication system, according to the water filling principal, a transmitter performs power allocation by which higher transmission power is allocated to a channel in good condition and lower power is allocated to a channel in poor condition, thus making it possible to maximize the communication capacity of the MIMO communication system.

On the other hand, the MMSE process is predicated on the allocation of the same power to each stream. Therefore, if the receiver simply performs spatial demultiplexing on streams subjected to power allocation at the transmitter in accordance with the MMSE process, the receiver disadvantageously cannot obtain an accurate antenna weight matrix. In this case, the original MMSE process is not implemented, thereby causing degradation in characteristics so that the communication capacity is not maximized.

The MIMO receiver according to an embodiment of the invention estimates a channel matrix in view of per-transmit-stream power allocation values, thereby implementing the original MMSE process even in the MIMO communication system subjected to power allocation and thus obtaining a more accurate antenna receive weight matrix. As a result, it is possible to enhance the spatial demultiplexing performance and thus prevent the performance of the entire receiver from deteriorating.

For example, the power estimator can acquire power allocation information from each receive stream into which the spatial demultiplexer has spatially demultiplexed and feedback the power allocation information to the channel matrix estimator, and the channel matrix estimator can estimate a channel matrix in view of the fed-back power allocation to each stream.

In this case, since the receiver spatially demultiplex the receive signals without using an accurate receive weight matrix until the completion of feedback, there is a problem that the reception performance is of inferior quality. Therefore, the receiver may include a receive buffer which temporarily stores receive signals of antennas before spatial demultiplexing by the spatial demultiplexer, and may store in the receive buffer receive signals that have been spatially demultiplexed using a channel matrix estimated before power allocation information is fed back. The spatial demultiplexer spatially demultiplexes again the receive signals stored in the receive buffer, using an antenna receive weight matrix obtained from a channel matrix estimated in view of the fed-back power allocation information.

For example, in the case where there is adopted a communication scheme by which a spatial multiplexing signal includes a known signal series, the channel matrix estimator can estimate a channel matrix based on a known signal series, and the power estimator can calculate power allocation to each stream based on a known signal series extracted from each stream after spatial demultiplexing. The communication scheme includes IEEE802.11a, IEEE802.11g, and HiperLAN/type2.

Further, in spatial multiplexing communication, there is adopted an OFDM transmission scheme for performing OFDM mapping on multiple subcarriers orthogonal to each other on a frequency axis. In such a case, the power estimator can calculate power allocation to each stream based on reception power of a known signal series such as a pilot carrier included in user data of each stream after spatial demultiplexing.

According to an embodiment of the invention, it is possible to a wireless communication apparatus and a wireless communication method excellent at being able to carry out MIMO communication forming multiple logical channels between a pair of a transmitter with multiple antennas and a receiver with multiple antennas by using spatial multiplexing.

According to another embodiment of the invention, it is possible to provide a wireless communication apparatus and a wireless communication method excellent at being able to spatially demultiplex, with high performance, a spatially multiplexed signal in which each transmit stream is subjected to beam forming at the transmitter.

According to another embodiment of the invention, it is possible to implement appropriate reception processing in a MIMO communication system subjected to the allocation of transmission power. That is, according to another embodiment of the invention, it is possible to provide a wireless communication apparatus and a wireless communication method excellent at being able to allow a receiver to spatially demultiplex, with high performance according to the MMSE process, a spatially multiplexed signal in which each transmit stream is subjected to optimal allocation of transmission power at the transmitter and contribute to improved transmission characteristics.

According to the MIMO receiver to which the invention is applied, it is possible to perform spatial demultiplexing in accordance with the MMSE criterion while preventing the transmission efficiency from deteriorating with the addition of a useless header area.

These and other features and advantages of the invention will be apparent from the following more particular descrip-

DESCRIPTION OF THE PREFERRED EMBODIMENTS

Hereinafter, embodiments of the present invention will be described in detail with reference to the accompanying drawings.

The present invention relates to MIMO communication in which spatial multiplexing signals are transmitted between a pair of a transmitter with multiple antennas and a receiver with multiple antennas. In the MIMO communication scheme, the transmitter allocates transmit data streams to the multiple antennas and transmits them through MIMO channels. At the other end, the receiver extracts receive data without crosstalk through signal processing on the spatially multiplexed signals received by its multiple antennas. The MIMO communication scheme can achieve enhancement in communication capacity and communication speed in accordance with the number of antennas without increasing the frequency band. Further, the MIMO communication scheme uses the spatial multiplexing, so that it exhibits high frequency utilization efficiency.

A. System Structure

Figure 1:
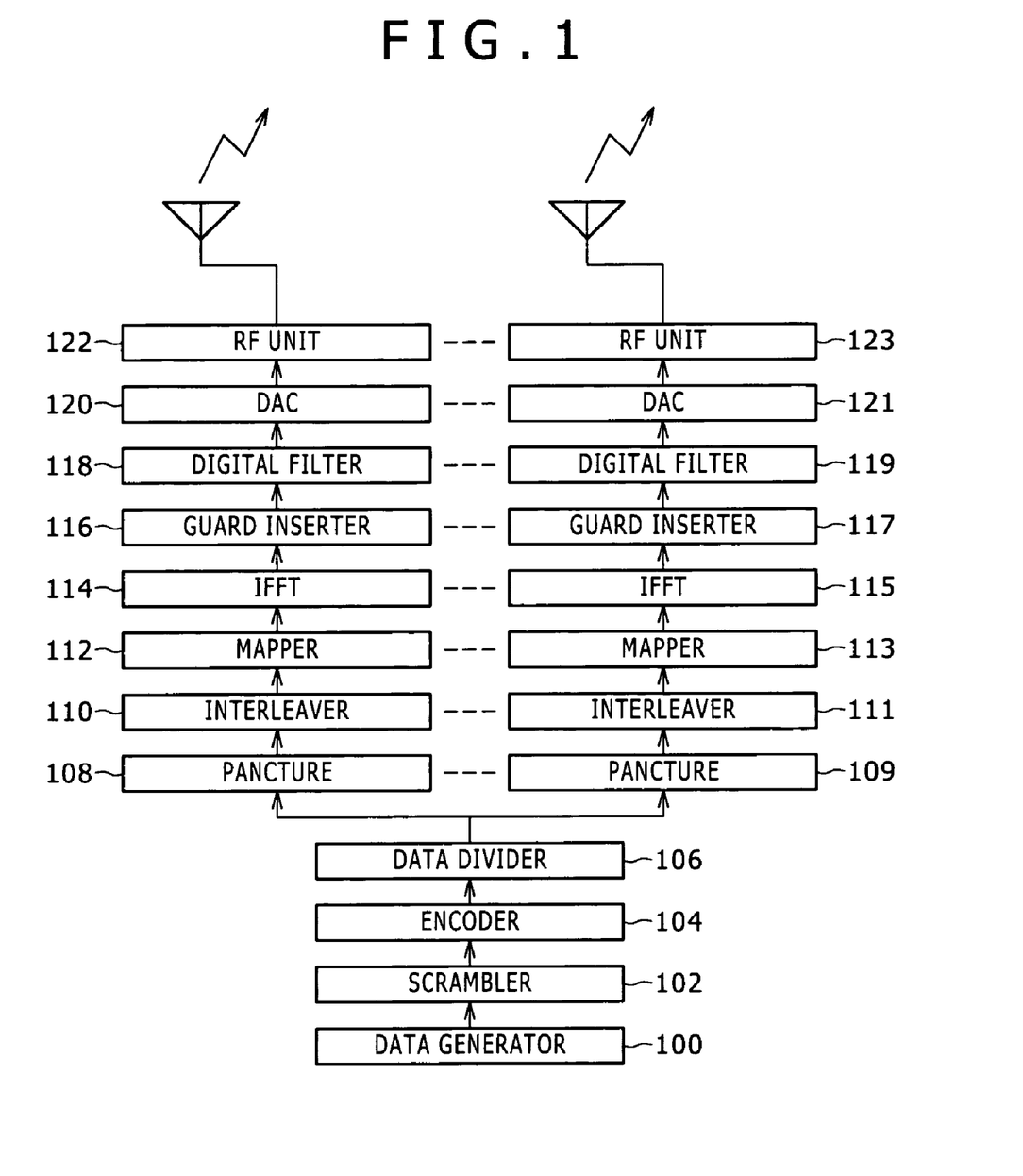
FIG. 1 is a diagram showing the structure of a MIMO transmitter according to an embodiment of the present invention.
Figure 2:
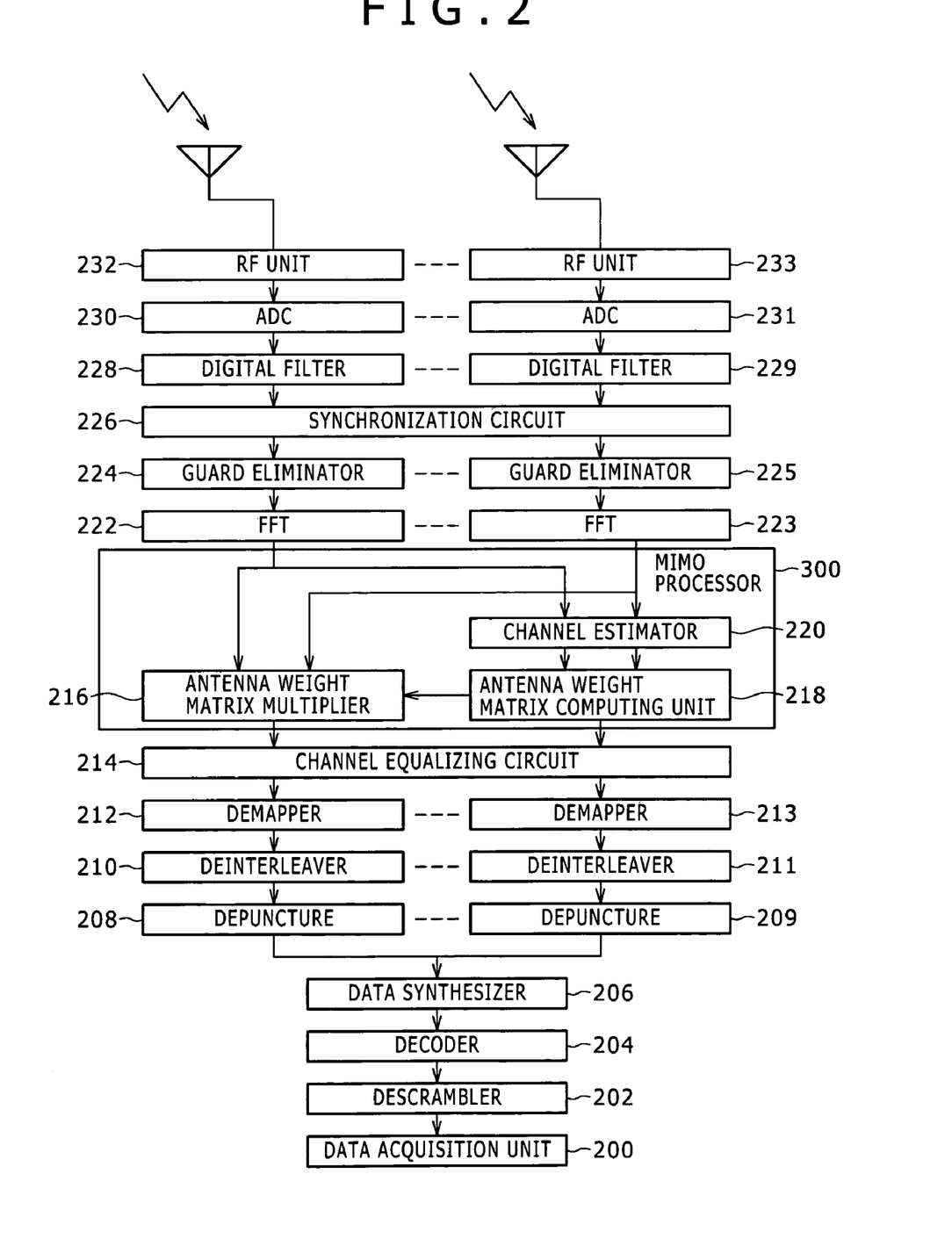
FIG. 2 is a diagram showing the structure of a MIMO receiver according to an embodiment of the invention.

FIG. 1 shows the structure of a MIMO transmitter according to an embodiment of the invention, and FIG. 2 shows the structure of a MIMO receiver according to an embodiment of the invention. The transmitter and the receiver shown in FIGS. 1 and 2 each have two antennas and two MIMO transmit/receive streams. However, the gist of the invention is not limited by the number of streams.

The communication system shown in FIGS. 1 and 2 is a MIMO-OFDM communication system employing an OFDM modulation scheme. The OFDM modulation scheme is a multicarrier transmission scheme by which the frequencies of subcarriers are set such that the subcarriers are orthogonal to each other in a symbol section. That the subcarriers are orthogonal to each other signifies that the peak point of the spectrum of an arbitrary subcarrier always matches the zero points of the spectra of other subcarriers. The OFDM modulation scheme provides high frequency utilization efficiency and high resistance to frequency-selective fading interference.

Transmit data supplied from a data generator 100 is scrambled by a scrambler 102. Then, the scrambled signal is subjected to error correction coding at an encoder 104. As for the type of encoder in this case, a convolutional encoder having R=½ and K=7 is adopted in IEEE802.11a for example. Then, the encoded signal is inputted to a data divider 106 which divides it into per-stream signals.

In each MIMO transmit stream, a transmit signal is punctured at a data rate provided for each stream by a puncture 108 or 109, interleaved by an interleaver 110 or 111, and mapped into IQ signal space by a mapper 112 or 113, so that complex baseband signals are created. After the subcarriers in the frequency domain are transformed into signals on the time axis through an IFFT 114 or 115, guard intervals are added to the signals. Then, after the signals are subjected to bandwidth reduction by a digital filter 118 or 119, the signals are converted into analog signals by a D/A converter 120 or 121. The analog signals are upconverted to an appropriate frequency band by an RF unit 122 or 123, and the upconverted signals are transmitted onto propagation paths from each transmit antenna.

On the other hand, in each MIMO receive stream, data that has reached the MIMO receiver through MIMO channels is analog-processed by an RF unit 232 or 233. The processed signals are converted into digital signals by an A/D converter 230 or 231, and the digital signals are inputted to a digital filter 228 or 229. A synchronization circuit 226 performs processing such as packet detection, timing detection and frequency offset correction, and then a guard eliminator 224 or 225 eliminates a guard interval added to the head of a data transmission section. Then, an FFT 222 or 223 transforms signals on the time axis into signals on the frequency axis.

A channel estimator 220 performs channel estimation for each transmit/receive antenna from signals acquired at each MIMO receive stream, and creates a channel matrix H having elements of the number of receive antennas times the number of transmit antennas.

An antenna receive weight matrix computing unit 218 calculates an antenna receive weight matrix W from the estimated channel matrix H, for example based on an MMSE algorithm. The MMSE is a method based on the logic of maximizing the ratio of signal power to square error (sum of crosstalk power and noise power). In the MMSE, noise power is added to the diagonal elements of the channel matrix, thereby to cancel interference and noise adjusting the balance between the interference and the noise and to acquire desired signal components. The MMSE is superior particularly under a high-noise environment.

An antenna receive weight matrix multiplier 216 spatially decodes the spatially multiplexed signals by multiplying the original receive signals by the antenna receive weight matrix W, and acquires per-stream signal series independent of each other.

In a MIMO communication system subjected to the allocation of transmission power, by acquiring power allocation information from each receive stream into which the antenna receive weight matrix multiplier 216 has spatially demultiplexed, the channel estimator 220 acquires a more accurate channel matrix H in view of the power allocation information.

In this case, the antenna receive weight matrix W becomes more accurate than it is calculated based on the previous channel matrix H (that is, the original MMSE process can be implemented), thereby making it possible to enhance the spatial demultiplexing performance and thus prevent the performance of the entire receiver from deteriorating. A detailed description will be made later on the acquisition of power allocation information and spatial demultiplexing based on power allocation.

A channel equalizing circuit 214 performs residual frequency offset correction, channel tracking and the like on a per-stream signal series. Then, a demapper 212 or 213 demaps a receive signal in IQ signal space, a deinterleaver 210 or 211 deinterleaves the demapped signal, a depuncture 208 or 209 depunctures the deinterleaved signal at a predetermined data rate, and a data synthesizer 206 synthesizes per-MIMO-receive-stream receive signals into one stream. This synthesizing process is the completely reverse operation to the data dividing performed by the transmitter. Then, a decoder 204 performs error correction decoding by soft decision, a descrambler 202 performs descrambling, and a data acquisition unit 200 acquires receive data.

In order to spatially demultiplex the spatially multiplexed signals into the receive streams, the MIMO receiver needs to acquire the channel matrix H in some way and obtain the receive weight matrix W from the channel matrix H in accordance with a predetermined algorithm.

B. Method for Acquiring a Channel Matrix

In general, the channel matrix H expressed by the above equation (2) is a matrix in which propagation paths (a, b, c and d in the example of equation (2)) for combinations of transmit/receive antennas are arranged in matrix form by transmitting and receiving known series between the transmitter and the receiver. In the case where the number of transmit antennas is N and the number of receive antennas is M, the channel matrix has the size of M rows×N columns. Therefore, it is sufficient that M×N known series, namely, M×N training signals are transmitted from the transmitter to the receiver.

Figure 3:
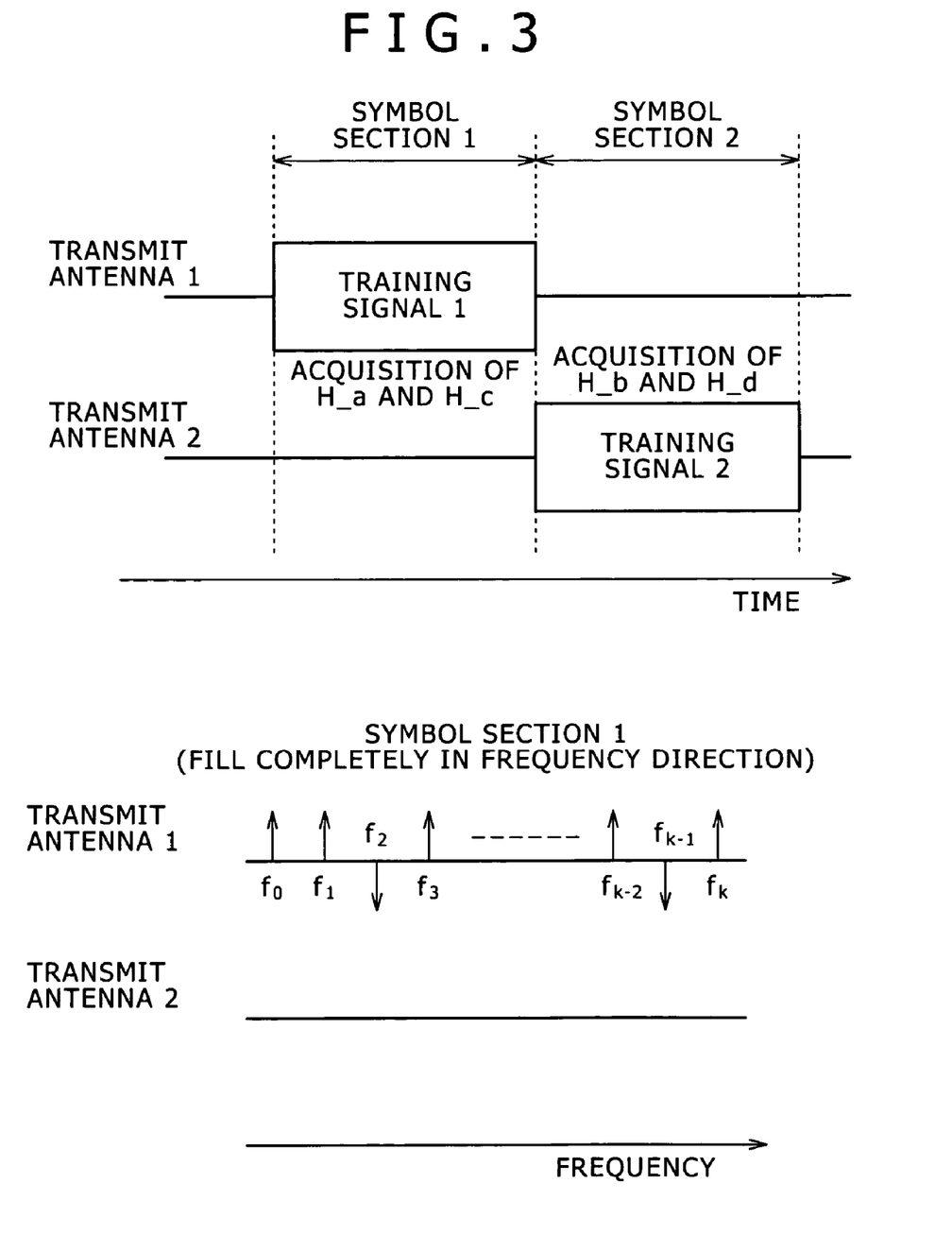
FIG. 3 is an explanatory view of a method for transmitting training signals from transmit antennas in a time-division manner.

However, if a plurality of training signals are transmitted at the same time without being processed, the receiver cannot determine which antenna transmits which training signal. In this embodiment, there is used a time-division method by which the transmitter transmits per-transmit-antenna training signals in a time-division manner (i.e., orthogonally in terms of time) and the channel estimator 220 in the receiver acquires a channel matrix H based on the training signals received by the receive antennas (see FIG. 3).

Figure 4:
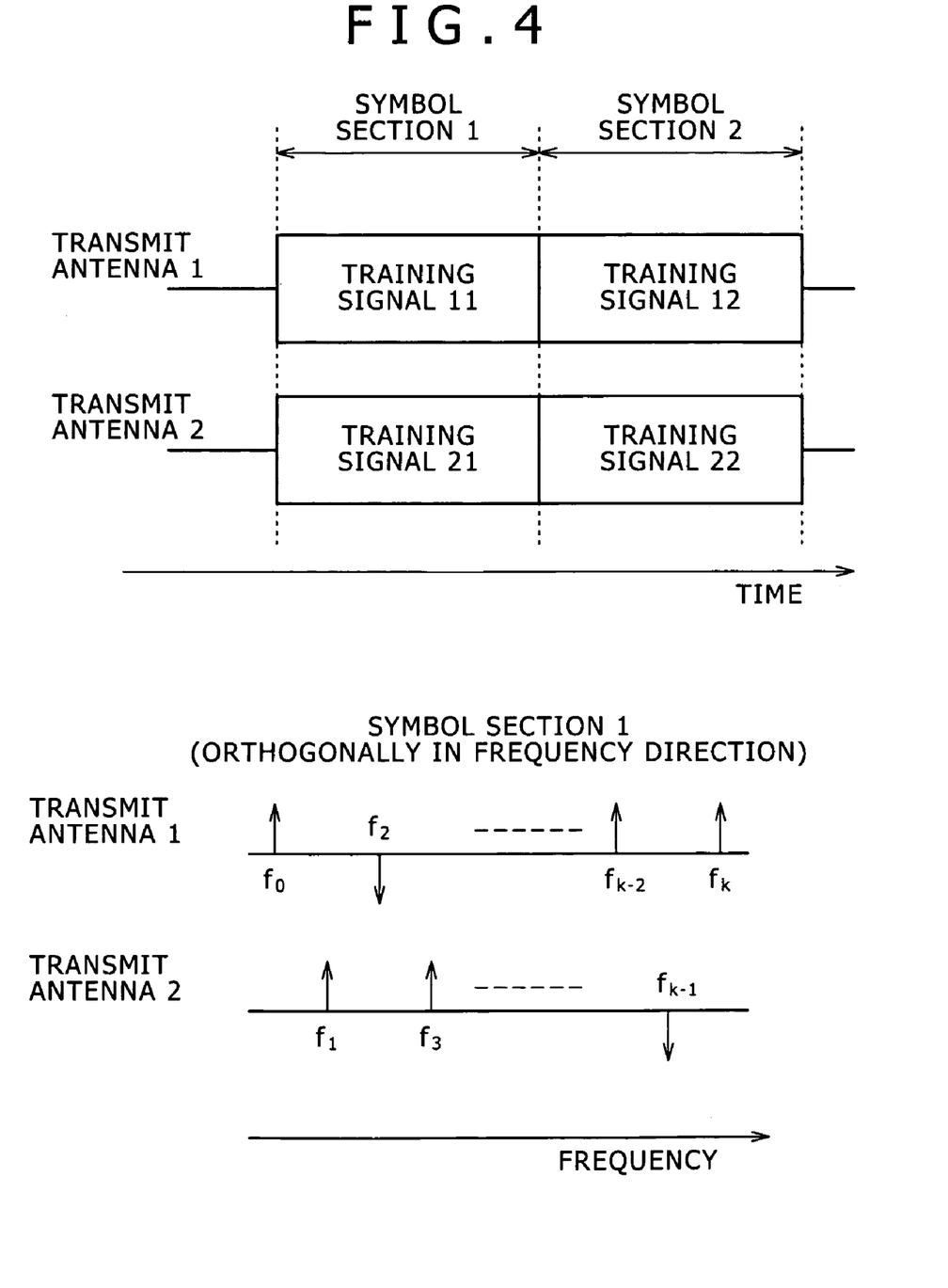
FIG. 4 is an explanatory view of a method for transmitting training signals from transmit antennas with tone interleaving.

Further, at the time of transmitting training signals in a time-division manner, it is possible to perform a tone interleaving operation for interchanging, for each subcarrier, positions at which training signals for MIMO channels are inserted. The tone interleaving is a method for acquiring a channel matrix using orthogonality on the frequency axis. It is said that the purpose of performing tone interleaving on training series is to avoid an unnecessary peak of power from antennas and uniform, over all receive branches, the reception gains of MIMO streams received through deteriorated crosstalk channels.

C. Power Allocation in the MIMO Communication System

By disposing multiple transmit/receive antennas, the MIMO communication system can enhance communication capacity without increasing the frequency band. The communication capacity of MIMO transmission can be further enhanced by carrying out spatial multiplexing transmission in which some weighting (beam forming) is performed at the transmitter.

For example, non-patent document 1 presents quantitatively the communication capacity for carrying out multiplex transmission using multiple streams. Assuming that signals having power S are transmitted by $n_t$ antennas and received by $n_r$ antennas, N is the average of noise power at the receive antennas, and $\lambda_i$ is the eigenvalue of the ith stream, communication capacity C (bits/sec/Hz) of the MIMO communication system is expressed by the following equation.

$$C = \sum_{i=1}^{\min(n_t, n_r)} \log_2(1 + \lambda_i S/N/\min(n_t, n_r)) \quad (5)$$

An actual communication system includes various streams having good S/N ratios (large eigenvalues) and poor S/N ratios (small eigenvalues). For this reason, it is known that it is possible to obtain communication capacity larger than what is expressed by the above equation (5), depending on the allocation of power to each stream.

When the above equation (5) is expanded using Lagrange's method of undetermined multiplier under the constraint of the fixed sum total of each stream power, the maximum communication capacity of the MIMO system is obtained by the following equation (6).

$$C = \sum_{i=1}^{\min(n_t, n_r)} \log_2\left(1 + \lambda_i \left[\frac{P_T + \sum_{i=1}^{\min(n_t, n_r)} \frac{\sigma^2}{\lambda_n}}{\min(n_t, n_r)} - \frac{\sigma^2}{\lambda_n}\right] \bigg/ \sigma^2 \right) \quad (6)$$

As in the above equation (6), the water filling principal refers to a principal that sets each transmission power to a value obtained by subtraction from the amount proportional to attenuation of the channel. That is, according to the water filling principal, the transmitter performs power allocation by which higher transmission power is allocated to a channel in good condition and lower power is allocated to a channel in poor condition, thus maximizing the communication capacity of the MIMO communication system.

For example, at the time of allocating different modulation schemes to each transmit stream based on communication quality, it is possible to determine power allocation to each stream using the water filling principal so as to obtain uniform communication quality among the streams. According to the water filling principal, in the case where the noise power is variable depending on the band or time, the transmitter sets the power for each band or time such that the sums (reference powers) of measured noise powers and signal powers are identical and performs communication, thereby making it possible to enhance the communication capacity per average transmit signal power. The reference power is determined based on, for example, error correction capability for the symbols being used for encoding and feedback on the reception state of the receiver.

D. Optimal Spatial Multiplexing in the MIMO Communication System Subjected to Power Allocation As described in the preceding paragraph C, the transmitter performs power allocation by which higher transmission power is allocated to a channel in good condition and lower power is allocated to a channel in poor condition, thus making it possible to maximize the communication capacity of the MIMO communication system.

However, there is a problem that the MIMO communication system subjected to power allocation cannot perform the original MMSE process. This is because the MMSE process is predicated on the allocation of the same power to each stream. In this case, if the receiver simply performs spatial demultiplexing on streams subjected to power allocation at the transmitter in accordance with the MMSE process, an accurate antenna weight matrix cannot be obtained, thereby causing degradation in characteristics so that the communication capacity is not maximized.

Therefore, in this embodiment, a MIMO processor 300 estimates a channel matrix in view of per-transmit-stream power allocation values, thus implementing the original MMSE process even in the MIMO communication system subjected to power allocation. As a result, a more accurate antenna receive weight matrix can be obtained, thereby making it possible to enhance the spatial demultiplexing performance and thus prevent the performance of the entire receiver from deteriorating.

Figure 5:
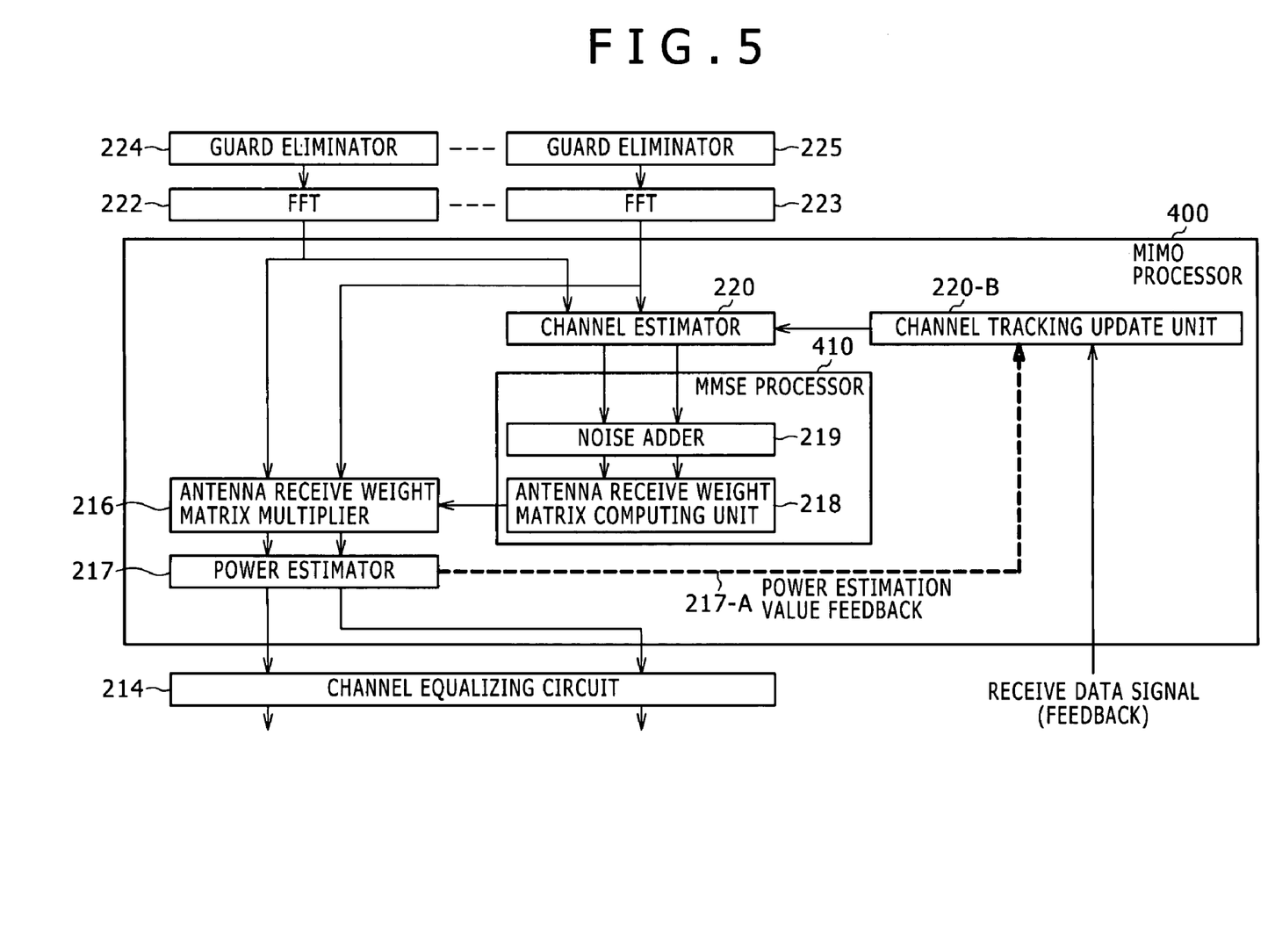
FIG. 5 is an example of the structure of a MIMO processor in the case of performing spatial demultiplexing in view of power allocation to each stream.

FIG. 5 shows in detail the structure of a MIMO processor 400 in the case of performing spatial demultiplexing in view of power allocation to each stream.

In the case of performing MIMO processing using the MMSE process, after channel estimation information acquired at the channel estimator 220 is indicated in matrix form, this channel matrix H is inputted to an MMSE processor 410.

In the MMSE processor 410, a noise adder 219 adds noise power to the diagonal elements of the channel matrix, and the antenna receive weight matrix computing unit 218 creates the inverse matrix $H^{-1}$ of the channel matrix H as an antenna receive weight matrix W with respect to the matrix to which noise has been added, in accordance with MMSE.

The antenna receive weight matrix multiplier 216 spatially demultiplexes into per-stream signals by multiplying the receive signals from the antennas by the thus obtained inverse matrix $H^{-1}$.

In the case where power allocation is performed for each stream at the transmitter, a power estimator 217 calculates per-stream power ratio $[p_1, p_2]$ by extracting pilot signal components from the signals into which the antenna receive weight matrix multiplier 216 has spatially demultiplexed for each stream and detecting the respective powers of the pilot signals of the streams. Further, the power estimator 217 feeds back the detected per-stream power ratio to the channel estimator 220, using a power-estimation-value feedback mechanism 217-A. In the example of FIG. 5, a channel tracking update unit 220-B provides power allocation values to the channel estimator 220 at a channel matrix update timing.

Further, if per-stream data signals are correct as a result of tentative determination of them, it is possible to refer to the powers (weighted as necessary) of data sections.

The channel estimator 220 multiplies channel estimation values by the fed-back power ratio $[p_1, p_2]$. At this time, the channel estimator 220 multiplies the row elements of the channel matrix H by the per-stream power allocation values. That is, letting the original channel matrix $H=[h_1, h_2]$, the result $[p_1 h_1, p_2 h_2]$ obtained by multiplying it by the power allocation values is outputted as a channel matrix.

The MMSE processor 410 creates the inverse matrix again with respect to the channel estimation matrix $[p_1 h_1, p_2 h_2]$ to which the power allocation values are applied, in accordance with the MMSE process. The antenna receive weight matrix multiplier 216 can cancel power allocation allocated to each stream at the time of spatially demultiplexing into per-stream signals by multiplying the receive signals from the antennas by the thus renewed inverse matrix $H^{-1}$.

The thus obtained signals are subjected to residual frequency offset processing, transmission/reception timing error correction, phase noise correction and the like at the channel equalizing circuit 214 and subjected to decode processing at the demapper and the units thereafter, thus making it possible to perform optimal MIMO processing. The processing in which the FFT 222 and 223 perform Fourier transform on the receive signals from the antennas to obtain OFDM signals and the processing performed by the channel equalizing circuit 214 and the units thereafter after the spatial demultiplexing by the MIMO processor 300 are the same as the foregoing; therefore, a detailed description thereof is omitted here.

As described, the MIMO receiver according to this embodiment has a structure in which the receiver performs MMSE processing temporarily for per-stream power detection and performs MMSE processing again for signal demultiplexing, thus making it possible to perform optimal MMSE processing in the MIMO communication system subjected to power allocation.

Since the receiver spatially demultiplex the receive signals without using an accurate receive weight matrix until the completion of feedback, there is a problem that the reception performance is of inferior quality. In order to address the problem, the MIMO processor temporarily stores receive signals that have been spatially demultiplexed using a channel matrix estimated before power allocation information is fed back, and spatially demultiplexes again the stored receive signals after obtaining an antenna receive weight matrix from a channel matrix estimated in view of the fed-back power allocation information.

Figure 6:
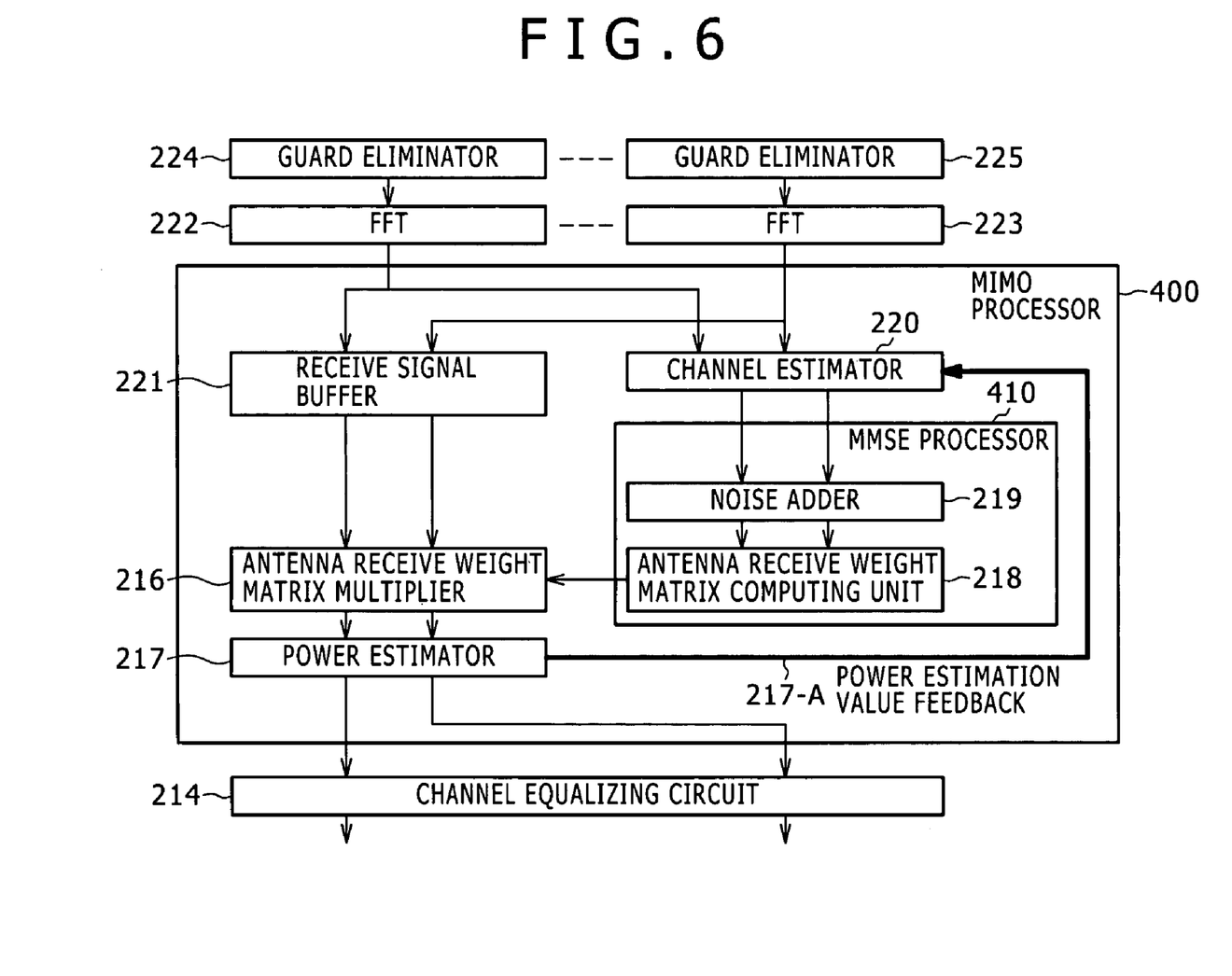
FIG. 6 is another example of the structure of a MIMO processor in the case of performing spatial demultiplexing in view of power allocation to each stream.

FIG. 6 shows in detail the structure of a MIMO processor 400 in this case.

In the case of performing MIMO processing using the MMSE process, after channel estimation information acquired at the channel estimator 220 is indicated in matrix form, this channel matrix H is inputted to the MMSE processor 410. In the MMSE processor 410, the noise adder 219 adds noise power to the diagonal elements of the channel matrix, and the antenna receive weight matrix computing unit 218 creates the inverse matrix $H^{-1}$ of the channel matrix H as an antenna receive weight matrix W with respect to the matrix to which noise has been added, in accordance with MMSE.

The antenna receive weight matrix multiplier 216 spatially demultiplexes into per-stream signals by multiplying the receive signals from the antennas by the thus obtained inverse matrix $H^{-1}$. At this time, the receive signals are buffered in a receive signal buffer 221 so as to be spatially demultiplexed again with a more accurate inverse matrix obtained at the next step.

In the case where power allocation is performed for each stream at the transmitter, the power estimator 217 calculates a per-stream power ratio by extracting pilot signal components from the signals into which the antenna receive weight matrix multiplier 216 has spatially demultiplexed for each stream and detecting the respective powers of the pilot signals of the streams. Further, the power estimator 217 feeds back the power ratio to the channel estimator 220 through the power-estimation-value feedback mechanism 217-A.

The channel estimator 220 multiplies channel estimation values by the fed-back power ratio. At this time, the channel estimator 220 multiplies the row elements of the channel matrix H by the per-stream power allocation values. The MMSE processor 410 creates the inverse matrix again with respect to the channel estimation matrix multiplied by the power allocation values, in accordance with the MMSE process. The antenna receive weight matrix multiplier 216 can cancel power allocation allocated to each stream at the time of spatially demultiplexing into per-stream signals by multiplying the receive signals from the antennas by the inverse matrix $H^{-1}$ obtained again by applying the power allocation values.

In the example of FIG. 6, the antenna receive weight matrix multiplier 216 multiplies the signals buffered in the receive signal buffer 221 by the inverse matrix of the channel matrix to which the power allocation values are applied, thus performing again more accurate spatial demultiplexing on the per-stream signals.

The thus obtained signals are subjected to residual frequency offset processing, transmission/reception timing error correction, phase noise correction and the like at the channel equalizing circuit 214 and subjected to decode processing at the demapper and the units thereafter, thus making it possible to perform optimal MIMO processing.

It is optional whether the MIMO processor 400 has the structure shown in FIG. 5 or FIG. 6. However, in the case where delay caused by the receive signal buffer becomes a problem, the channel tracking update unit 220-B may be employed in place of the receive signal buffer 221, as shown in FIG. 5. In this case, a channel matrix in view of power allocation values is concurrently estimated at a channel matrix update timing, an inverse matrix is created, and then signals are demultiplexed into each stream. Thus, it becomes possible to provide better performance at the time of spatial demultiplexing using the MMSE process in the MIMO communication system subjected to power allocation while minimizing delay in the process of signal demultiplexing.

Figure 7:
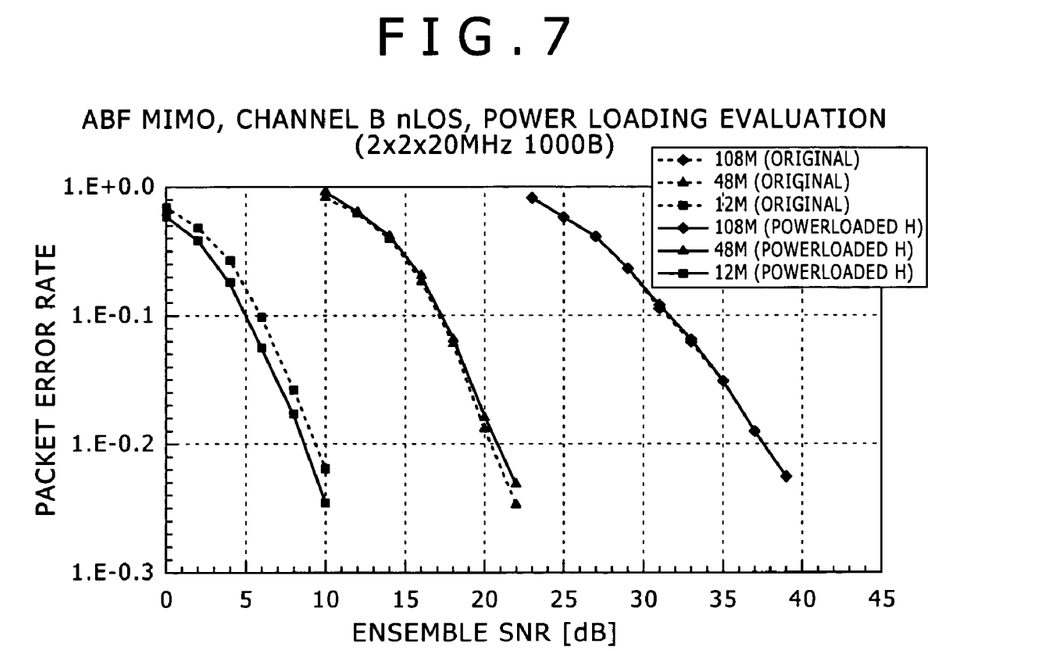
FIG. 7 is a graph showing the results of computer simulation indicating the effects of MIMO reception processing with an MMSE process in view of power allocation to each stream.
Figure 8:
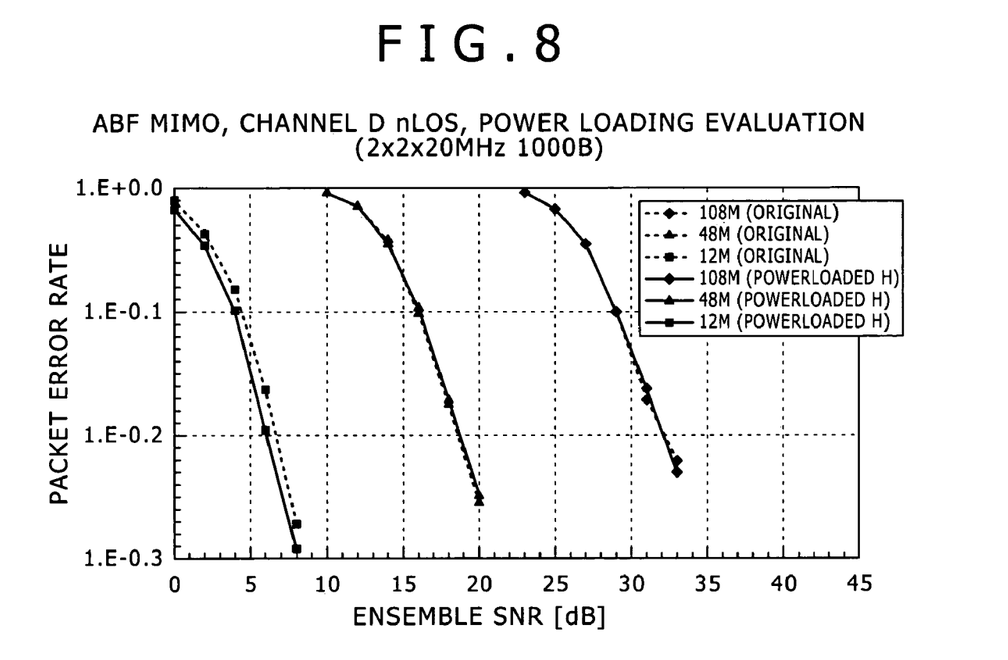
FIG. 8 is a graph showing the results of computer simulation indicating the effects of MIMO reception processing with an MMSE process in view of power allocation to each stream.

FIGS. 7 and 8 respectively show the results of verifying the effects of MIMO reception processing with the MMSE process in view of power allocation to each stream using computer simulation. In FIGS. 7 and 8, simulation is performed using two channel models defined in IEEE802.11 TGn with two transmit antennas and two receive antennas. In FIGS. 7 and 8, there are plotted packet error rates in performing MIMO transmission at transmission rates applied in SNR regions in each channel model.

As shown in FIGS. 7 and 8, the present invention produces noticeable advantages in lower SNR regions where lower transmission rates are applied, that is, in high-noise environments. The MMSE has a feature that the receiver can cancel interference and noise, suitably adjusting the balance between the interference and the noise in lower SNR regions, for stream demultiplexing. The feature is distinctly shown in FIGS. 7 and 8.

The present invention has been described in detail with reference to the specific embodiments. However, it is obvious that those skilled in the art can make modifications and/or substitutions of the embodiments without departing from the scope and sprit of the invention.

In this specification, the description has been made on the embodiments in which the invention is applied to the MIMO communication system employing the MMSE algorithm to acquire an antenna receive weight matrix. However, the scope and sprit of the invention is not limited to the embodiments. In the same way, the invention can have an effect on a MIMO communication system employing another algorithm for obtaining an antenna weight in view of noise power.

Further, in this specification, the description has been made on the embodiments as to a MIMO-OFDM communication system. However, in the same way, the invention can be applied to other types of MIMO system structures.

That is, the embodiments have been described for illustrative purpose only, and the contents of the specification should not be interpreted restrictively. To understand the scope and sprit of the invention, the appended claims should be taken into consideration.

What is claimed is:

1. A wireless communication apparatus which receives, by multiple antennas, receive signals created by spatially multiplexing multiple transmit streams subjected to power allocation, the wireless communication apparatus comprising:
   a channel matrix estimator which estimates a channel matrix of spatially multiplexed channels based on the received signals;
   a receive buffer which temporarily stores the receive signals;
   a spatial demultiplexer which obtains an antenna receive weight matrix from the estimated channel matrix and demultiplexes the receive signals temporarily stored in the receive buffer into multiple receive streams by multiplying the receive signals by the antenna receive weight matrix;
   wherein the receive signals that have been demultiplexed using the channel matrix are stored in the receive buffer; and
   a power estimator which estimates power allocation information as to each stream;
   wherein the channel matrix estimator re-estimates the channel matrix based on the power allocation information; and
   wherein the spatial demultiplexer re-demultiplexes the demultiplexed receive signals in the receive buffer according to the re-estimated channel matrix.

2. The wireless communication apparatus according to claim 1, wherein the spatial demultiplexer calculates an antenna receive weight matrix in accordance with an MMSE (Minimum Mean Square Error) algorithm based on a logic of maximizing the ratio of signal power to square error and multiplies the receive signals by the antenna receive weight matrix.

3. The wireless communication apparatus according to claim 1, wherein the power estimator acquires power allocation information from each receive stream into which the spatial demultiplexer has spatially demultiplexed and feeds back the power allocation information to the channel matrix estimator.

4. The wireless communication apparatus according to claim 3, wherein the re-estimated channel matrix provides an antenna receive weight matrix for the spatial demultiplexer to re-demultiplex the receive signals.

5. The wireless communication apparatus according to claim 1, wherein
   a spatial multiplexing signal includes a known signal series;
   the channel matrix estimator estimates the channel matrix based on a known signal series; and
   the power estimator calculates power allocation to each stream based on the known signal series extracted from each stream after spatial demultiplexing.

6. The wireless communication apparatus according to claim 5, wherein
   in spatial multiplexing communication, there is adopted an OFDM transmission scheme for performing OFDM mapping on multiple subcarriers orthogonal to each other on a frequency axis, and
   the power estimator calculates power allocation to each stream based on reception power of a pilot carrier included in user data of each stream after spatial demultiplexing.

7. The wireless communication apparatus according to claim 5, wherein the known signal series complies with one of IEEE802.11a, IEEE802.11g, and HiperLAN/type2.

8. A wireless communication method comprising:
- receiving, by multiple antennas, receive signals created by spatially multiplexing multiple transmit streams subjected to power allocation;
- estimating a channel matrix of spatially multiplexed channels based on the receive signals;
- obtaining an antenna receive weight matrix from the estimated channel matrix;
- temporarily storing the receive signals of the antennas in a receive buffer;
- demultiplexing the receive signals temporarily stored in the receive buffer into multiple receive streams by multiplying the receive signals by the antenna receive weight matrix;
- storing the receive signals that have been demultiplexed in the receive buffer;
- estimating power allocation information as to each stream;
- re-estimating the channel matrix based on the power allocation information; and
- re-demultiplexing the demultiplexed receive signals stored in the receive buffer according to the re-estimated channel matrix.

9. The wireless communication method according to claim 8, further comprising:
- calculating an antenna receive weight matrix in accordance with an MMSE (Minimum Mean Square Error) algorithm based on a logic of maximizing the ratio of signal power to square error; and
- multiplying the receive signals by the antenna receive weight matrix.

10. The wireless communication method according to claim 8, further comprising:
- acquiring power allocation information from each receive stream that has been demultiplexed; and
- feeding back the power allocation information for re-estimating the channel matrix.

11. The wireless communication method according to claim 10, wherein re-demultiplexing the receive signal further comprises:
- obtaining an antenna receive weight matrix from the re-estimated channel matrix for re-demultiplexing the receive signal.

12. The wireless communication method according to claim 8, wherein
- a spatial multiplexing signal includes a known signal series;
- the estimating the channel matrix further comprises estimating the channel matrix based on the known signal series; and
- the estimating power allocation information further comprises calculating power allocation to each stream based on the known signal series extracted from each stream after demultiplexing.

13. The wireless communication method according to claim 12, wherein
- in spatial multiplexing communication, there is adopted an OFDM transmission scheme for performing OFDM mapping on multiple subcarriers orthogonal to each other on a frequency axis, and
- the estimating power allocation information further comprises calculating power allocation to each stream based on reception power of a pilot carrier included in user data of each stream after demultiplexing.

14. The wireless communication method according to claim 12, wherein the known signal series complies with one of IEEE802.11a, IEEE802.11g, and HiperLAN/type2.

* * * * *